(12) United States Patent
Buskens et al.

(10) Patent No.: US 7,873,941 B2
(45) Date of Patent: *Jan. 18, 2011

(54) MANAGER COMPONENT THAT CAUSES FIRST SOFTWARE COMPONENT TO OBTAIN INFORMATION FROM SECOND SOFTWARE COMPONENT

(75) Inventors: Richard W. Buskens, Robbinsville, NJ (US); Kazutaka Murakami, Freehold, NJ (US); Yow-Jian Lin, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 936 days.

This patent is subject to a terminal disclaimer.

(21) Appl. No.: 10/868,469

(22) Filed: Jun. 14, 2004

(65) Prior Publication Data

US 2005/0278578 A1    Dec. 15, 2005

(51) Int. Cl.
*G06F 9/44* (2006.01)
*G06F 9/445* (2006.01)
*G06F 15/16* (2006.01)
*G06F 15/177* (2006.01)

(52) U.S. Cl. .................. 717/106; 717/176; 709/202; 713/1

(58) Field of Classification Search ............ 717/174, 717/176; 709/202
See application file for complete search history.

(56) References Cited

U.S. PATENT DOCUMENTS

| | | | | |
|---|---|---|---|---|
| 5,313,647 A | * | 5/1994 | Kaufman et al. | 718/102 |
| 5,699,310 A | * | 12/1997 | Garloff et al. | 717/108 |
| 5,852,666 A | * | 12/1998 | Miller et al. | 713/167 |
| 5,923,832 A | * | 7/1999 | Shirakihara et al. | 714/37 |
| 6,230,210 B1 | * | 5/2001 | Davies et al. | 709/248 |
| 6,708,288 B1 | * | 3/2004 | Ziegler et al. | 714/15 |
| 6,874,138 B1 | * | 3/2005 | Ziegler et al. | 717/127 |
| 6,883,170 B1 | * | 4/2005 | Garcia | 718/1 |

OTHER PUBLICATIONS

Silva, L.M.E.; Silva, J.G.; , "Global checkpointing for distributed programs," Reliable Distributed Systems, 1992. Proceedings., 11th Symposium on , vol., No., pp. 155-162, Oct. 5-7, 1992 doi: 10.1109/RELDIS.1992.235131 URL: http://ieeexplore.ieee.org/stamp/stamp.jsp?tp=&arnumber=235131&isnumber=6053.*

* cited by examiner

*Primary Examiner*—James D Rutten
(74) *Attorney, Agent, or Firm*—Carmen Patti Law Group, LLC

(57) ABSTRACT

A distributed software application comprises a first and second software component. A manager component of a management infrastructure for the distributed software application in one example causes a first software component of the distributed software application to obtain information from a second software component of the distributed software application for initialization of the first software component.

18 Claims, 1 Drawing Sheet

MANAGER COMPONENT THAT CAUSES FIRST SOFTWARE COMPONENT TO OBTAIN INFORMATION FROM SECOND SOFTWARE COMPONENT

CROSS-REFERENCE TO RELATED APPLICATIONS

This application contains subject matter that is related to the subject matter of the following applications, which are assigned to the same assignee as this application. The below listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., patent application Ser. No. 10/868,128, co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., patent application Ser. No. 10/868,404, co-filed herewith;

"SOFTWARE COMPONENT INITIALIZATION IN AN ORDERED SEQUENCE," by Buskens, et al., Patent Application No. 10/867,945, co-filed herewith;

"SHUTTING DOWN A PLURALITY OF SOFTWARE COMPONENTS IN AN ORDERED SEQUENCE," by Buskens, et al., patent application Ser. No. 10/868,142, co-filed herewith;

"DISTRIBUTED SOFTWARE APPLICATION SOFTWARE COMPONENT RECOVERY IN AN ORDERED SEQUENCE," by Buskens, et al, patent application Ser. No. 10/867,590, co-filed herewith;

"MANAGER COMPONENT FOR CHECKPOINT PROCEDURES," by Buskens, et al., patent application Ser. No. 10/868,127, co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., patent application Ser. No. 10/867,946, co-filed herewith;

"MANAGER COMPONENT RESOURCE ADDITION AND/OR RESOURCE REMOVAL ON BEHALF OF DISTRIBUTED SOFTWARE APPLICATION," by Gong, et al., patent application Ser. No. 10/868,144, co-filed herewith.

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., patent application Ser. No. 10/868,472, co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The software components often store state information, for example, a checkpoint, to reduce recovery time of a failed or newly initialized software component. In known distributed software applications, the software components individually manage checkpoints and their associated checkpoint procedures. Although software components often share state information between each other, each software component performs checkpointing of its own state information.

As one shortcoming, application developers must add extra software to the software components to perform checkpoint procedures in all execution scenarios. As another shortcoming, the state information that is shared between software components is checkpointed by each software component, which reduces storage efficiency and lowers run-time performance.

Thus, a need exists to alleviate the responsibility of application developers, to promote an increase in storage efficiency of software components of distributed software applications and to promote an increase in performance resulting from the improved storage efficiency.

SUMMARY

In one embodiment, there is provided an apparatus comprising a manager component of a management infrastructure for a distributed software application that causes a first software component of the distributed software application to obtain information from a second software component of the distributed software application for initialization of the first software component.

In another embodiment, there is provided a method for obtaining information for a first software component from a second software component, of a distributed software application, identified by a high availability manager component of the distributed software application.

In yet another embodiment, there is provided an apparatus comprising a high availability manager component of a high availability infrastructure for a distributed software application that comprises at least a first software component and a second software component. The first software component comprises first application software that performs a first portion of functionality of the distributed software application and first management support software that comprises a first portion of the high availability infrastructure. The second software component comprises second application software that performs a second portion of functionality of the distributed software application and second management support software that comprises a second portion of the high availability infrastructure. The high availability manager component causes the first management support software of the first software component to obtain information from the second management support software of the second software component.

DESCRIPTION OF THE DRAWINGS

Features of exemplary implementations of the invention will become apparent from the description, the claims, and the accompanying drawings in which:

DETAILED DESCRIPTION

Figure 1:
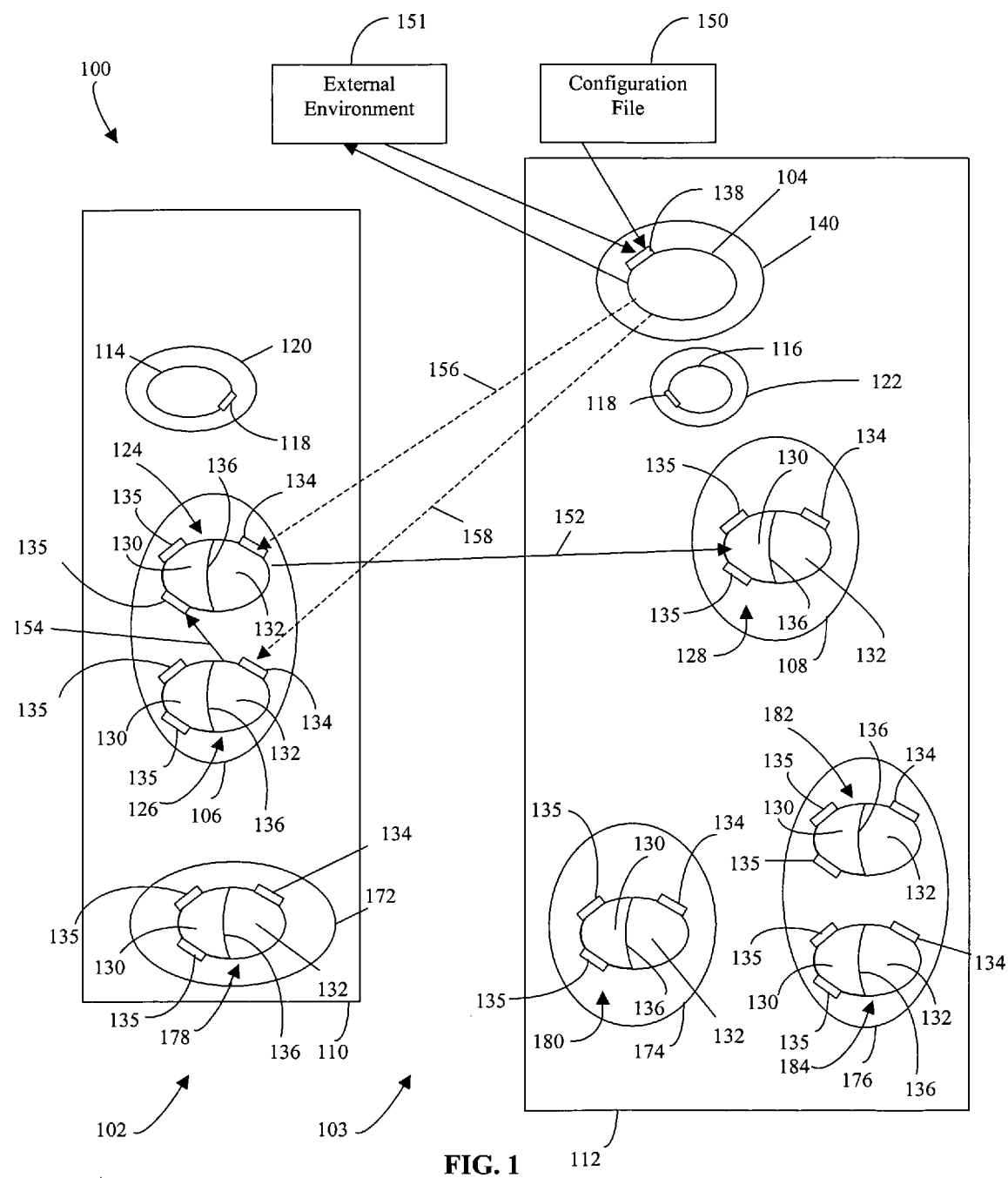
FIG. 1 is a representation of an exemplary implementation of an apparatus that comprises a distributed software application and a management infrastructure.

Turning to FIG. 1, an apparatus 100 in one example comprises a distributed software application 102 and one or more management infrastructures 103. The distributed software application 102 represents a software application divided among a plurality of executables (i.e., software capsules or software entities). For example, the distributed software application 102 comprises a plurality of executables 106, 108, 172, 174 and 176. The distributed software application 102 may run on a single central processing unit ("CPU") or may be divided between multiple CPUs. For example, the executable 106 may run on a processor 110 and the executable 108 may run on a processor 112.

The executables 106, 108, 172, 174 and 176 comprise one or more software components 124, 126, 128, 178, 180, 182 and 184 of the distributed software application 102, as described herein. For example, the executable 106 encapsulates the software components 124 and 126 and the executable 108 encapsulates the software component 128. Within each of the executables 106, 108, 172, 174 and 176 may be tens, hundreds, or even thousands of other software components (e.g., analogous to the software components 124, 126, 128, 178, 180, 182 and 184).

The distributed software application 102 comprises a plurality of software components, for example, the software components 124, 126, 128, 178, 180, 182 and 184. The software components 124, 126, 128, 178, 180, 182 and 184 represent software sub-entities of the executables 106, 108, 172, 174 and 176. For example, the software components 124, 126, 128, 178, 180, 182 and 184 represent logical software blocks and/or software objects. The software components 124 and 126 in one example are developed independently and then put together within the executable 106. For example, the software components 124 and 126 are compiled into the executable 106. The distributed software application 102 may provide any functionality for a computer system. The distributed software application 102 in one example comprises a call processing software application. For example, the distributed software application 102 sets up and/or tears down telecommunication sessions in a telecommunication network.

The management infrastructure 103 performs one or more management procedures for the distributed software application 102. For example, the management infrastructure 103 provides a reusable software framework for one or more management procedures. For example, the management infrastructure 103 handles one or more of starting, stopping, initializing, and monitoring the distributed software application 102, detecting failures of the distributed software application 102, recovering the distributed software application 102, propagating state changes about the distributed software application 102, establishing communication channels between the software components 124, 126, 128, 178, 180, 182 and 184, and the like.

The management infrastructure 103 in one example comprises one or more manager components 104, one or more executable managers 114 and 116 and/or one or more management support components 132. The management infrastructure 103 may run on one or more of the processors 110, 112, and/or a remote processor (not shown). The manager component 104 in one example handles startup, shutdown, initialization, failure detection, recovery, and other functions for the distributed software application 102, as will be appreciated by those skilled in the art.

One or more of the components of the management infrastructure 103, for example, the manager component 104, the executable managers 114 and 116, and the management support software 132 of the software components 124, 126, 128, 178, 180, 182 and/or 184, in one example detect one or more failures and/or faults of the distributed software application 102 and/or the management infrastructure 103. In one example, the software component 124 of the distributed software application 102 returns a response to the manager component 104 during initialization that indicates an error. In another example, the manager component 104 employs a timer to determine a timeout for a message response. For example, the manager component 104 determines an error has occurred if it has not received a message response from the software component 124 within a pre-determined time interval, for example, thirty seconds. The components of the management infrastructure 103 in one example communicate through employment of a fault-tolerant and/or redundant messaging protocol. For example, the fault-tolerant messaging protocol comprises handshake procedures, delivery confirmations, message timeouts, fault detection procedures, and fault escalation procedures, as will be appreciated by those skilled in the art.

The manager component 104 comprises a communication interface 138 for receiving incoming communications. The communication interface 138 is employable for receiving a configuration file 150 for the distributed software application 102. The manager component 104 may employ other means to receive the configuration file 150, such as reading the configuration file 150 directly from a disk or file system. The manager component 104 may also use the communication interface 138 for receipt of external system information from an external environment 151. The external environment 151 in one example represents other components of the system that are in communication with the manager component 104. The communication interface 138 may also receive communications from the executable managers 114 and 116, as well as communications from the software components 124, 126, 128, 178, 180, 182 and 184. The manager component 104 is encapsulated with zero or more other software components in an executable 140. The executable 140 that contains the manager component 104 may be run on either of the processors 110 and 112.

The manager component 104 in one example establishes one or more communication channels between the software components 124, 126, 128, 178, 180, 182 and 184. In one example, the manager component 104 establishes a communication channel 152 between the software component 124 and the software component 128. In another example, the manager component 104 establishes a communication channel 154 between the software component 126 and the software component 124. The manager component 104 sends one or more messages, for example, the messages 156 and 158, to the management support software 130 of the software components 124 and 126, respectively, to establish the communication channels 152 and 154.

The executable managers 114 and 116 comprise a communication interface 118 for communication with the manager component 104. The executable managers 114 and 116 in one example receive instruction from the manager component 104. For example, the executable managers 114 and 116 may receive instructions at the communication interface 118 from the manager component 104. The executable managers 114 and 116 in one example are encapsulated in an executable 120 and an executable 122, respectively.

The executable managers 114 and 116 monitor executables and/or software components of the distributed software application 102 that run on the processors 110 and 112, such as the executables 106, 108, 172, 174 and 176 and the software components 124, 126, 128, 178, 180, 182 and/or 184. For example, the executable managers 114 and 116 monitor communication channels and/or diagnostics on behalf of the executables 106, 108, 172, 174 and 176, and the software components 124, 126, 128, 178, 180, 182 and 184. Should one or more of the executables 106, 108, 172, 174 and 176 and/or the software components 124, 126, 128, 178, 180, 182 and 184 fail, the respective executable manager informs the manager component 104 of the failure.

In one example, the management infrastructure 103 comprises one executable manager per processor. For example, the executable 120 of the executable manager 114 runs on the processor 110. The executable manager 114 monitors the executables 106 and 172 and the software components 124, 126 and 178. The executable 122 of the executable manager 116 runs on the processor 112. The executable manager 116 monitors the executables 108, 174 and 176 and the software components 128, 180, 182 and 184.

Each of the software components 124, 126, 128, 178, 180, 182 and 184 comprise application software 130, management support software 132, a management support software communication interface 134, and one or more application software communication interfaces 135. The software components 124, 126, 128, 178, 180, 182 and 184 employ the management support software communication interface 134 to receive communications from the manager component 104. The software components 124, 126, 128, 178, 180, 182 and 184 employ the application software communication interfaces 135 to receive communications from other software components of the software components 124, 126, 128, 178, 180, 182 and 184. An application programming interface ("API") 136 communicatively couples the application software 130 with the management support software 132 in each of the software components 124, 126, 128, 178, 180, 182 and 184. The application software 130 and the management support software 132 can exchange information through the application programming interface 136. The manager component 104 in one example generates the application programming interface 136 through employment of a code generator.

The software components 124, 126, 128, 178, 180, 182 and 184 each perform some portion of the overall functionality of the distributed software application 102. The software components 124, 126, 128, 178, 180, 182 and 184 work together to make the distributed software application 102 achieve the desired operation. For example, the software components 124, 126, 128, 178, 180, 182 and 184 process incoming requests from each other and perform operations to provide the overall functionality.

An application developer creates the application software 130 of the software components 124, 126, 128, 178, 180, 182 and 184 to perform the designated functionality of the software components 124, 126, 128, 178, 180, 182 and 184. For example, the application developer creates the application software 130 of the software components 124, 126, 128, 178, 180, 182 and 184 to achieve the overall functionality of the distributed software application 102. The management support software 132 of the software components 124, 126, 128, 178, 180, 182 and 184 communicatively couples the software components 124, 126, 128, 178, 180, 182 and 184 to allow the application software 130 to perform the functionality of the distributed software application 102.

To alleviate the application developers from being required to write software into each of the software components 124, 126, 128, 178, 180, 182 and 184 for the management procedures, the manager component 104, the executable managers 114 and 116, and the management support software 132 cooperate to perform the management procedures for the software components 124, 126, 128, 178, 180, 182 and 184. A code generator of the management infrastructure 103 in one example automatically generates the management support software 132. The code generator of the management infrastructure 103 employs the configuration file 150 to create the management support software 132. For example, the configuration file 150 comprises connection information and/or architecture information of the distributed software application 102. The code generator creates code for the management support software 132. The code for the management support software 132 is compiled and linked with the application software 130 in the software components 124, 126, 128, 178, 180, 182 and 184. The management support software 132 may be different for each of the software components 124, 126, 128, 178, 180, 182 and 184, as will be appreciated by those skilled in the art.

One or more of the manager component 104, the executable managers 114 and 116, and/or the software components 124, 126, 128, 178, 182, 184 and 180 in one example comprise a portion of an active/standby group. Each active/standby group comprises a first component (i.e. active component) and a second component (i.e. standby component). The first component performs a portion of the overall functionality of the distributed software application 102 or the management infrastructure 103 while the second components remain inactive. Upon a failure of the first component, the second component is promoted to an active status. For example, the standby component becomes an active component and begins to perform the portion of the overall functionality. The standby component provides a redundancy in operation of the distributed software application 102 and/or the management infrastructure 103. The active/standby group promotes a reduction in downtime for the distributed software application 102 and/or the management infrastructure 103, as will be appreciated by those skilled in the art.

During operation of the distributed software application 102, the software components 124, 126, 128, 178, 182, 184 and/or 180 in one example perform one or more checkpoint procedures, as described in SOFTWARE COMPONENT INITIALIZATION IN AN ORDERED SEQUENCE. A checkpoint comprises a portion of state information for the software components 124, 126, 128, 178, 182, 184 and/or 180. Exemplary state information comprises one or more variables, data structures, and/or software objects, as will be appreciated by those skilled in the art. The software components 124, 126, 128, 178, 182, 184 and/or 180 in one example share state information. For example, the software component 124 shares state information with the software component 126. The software component 126 comprises a first portion and a second portion of state information. The software component 124 shares the first portion of state information with the software component 126. The software component 126 does not perform a checkpoint procedure for the first portion of state information.

In one example, upon a failure and/or recovery of the software component 126, the software component 126 reloads the first portion of state information from the software component 124. In another example, upon initialization of the software component 126, the software component 126 loads the first portion of state information from the software component 124. The software component 124 and the software component 126 in one example comprise different types of software components. For example, the software components 124 and 126 may perform different portions of the overall functionality of the distributed software application 102, as will be appreciated by those skilled in the art.

Loading and/or reloading of the first portion of state information from the software component 124 promotes a reduction in recovery time of the software component 126. The application programming interface 136 comprises a function call interface. For example, the application programming interface 136 comprises a "GetStateInfo( . . . )" function for obtaining a checkpoint from the application software 130 and a "SetStateInfo( . . . )" function for setting one or more data structures of the application software 130 to an initial value, as will be appreciated by those skilled in the art.

An illustrative description of exemplary operation of the apparatus 100 is presented, for explanatory purposes. The software component 124 in one example comprises a first portion of state information. The software component 126 comprises the first portion of the state information and a second portion of state information. For example, the first portion of state information is shared between the software component 124 and the software component 126. When performing a checkpoint procedure, the software component 124 creates a first checkpoint that comprises the first portion of state information. The software component 126 creates a second checkpoint that comprises only the second portion of state information, such that the first portion of state information is not stored more than necessary, as will be appreciated by those skilled in the art.

In one example, upon a recovery of the software component 126, the manager component 104 causes an initialization of the software component 126, as described in DISTRIBUTED SOFTWARE APPLICATION SOFTWARE COMPONENT RECOVERY IN AN ORDERED SEQUENCE. In another example, upon startup of the software component 126, the manager component 104 causes the initialization of the software component 126, as described in SOFTWARE COMPONENT INITIALIZATION IN AN ORDERED SEQUENCE, incorporated herein by reference. For example, the software component 126 comprises one or more data structures that must be set to an initial value. The software component 126 requires the first portion of state information and the second portion of state information to be initialized.

During the initialization of the software component 126, the management support software 132 of the software component 126 employs the second checkpoint to obtain the second portion of state information, as described in MANAGER COMPONENT FOR CHECKPOINT PROCEDURES. To obtain the first portion of state information, the manager component 104 in one example sends a first message to the management support software 132 of the software component 126. The first message comprises one or more of an object reference, a key, and/or a logical timestamp. The object reference in one example corresponds to one of the software components of the distributed software application 102 that comprise the first portion of state information, for example, the software component 124.

The key of the first message corresponds to the first portion of state information that the software component 126 requires for initialization. In one example, the key corresponds to a checkpoint of the software component 124. For example, the key comprises a data structure identifier for the first checkpoint. The logical timestamp serves to provide a sequential and/or chronological ordering for multiple checkpoints. For example, a checkpoint with a later timestamp may be preferable to a checkpoint with an earlier timestamp. The key and the logical timestamp uniquely identify each checkpoint of the software component 124, as will be appreciated by those skilled in the art.

Upon receipt of the first message, the management support software 132 of the software component 126 obtains a checkpoint from the software component identified by the object reference of the first message, for example, the software component 124. The management support software 132 of the software component 126 sends a second message to the management support software 132 of the software component 124 to request the checkpoint. The second message comprises the key and the logical timestamp for the checkpoint. The management support software 132 of the software component 124 employs the application programming interface 136 of the software component 124, the key, and the logical timestamp to obtain the checkpoint from the application software 130 of the software component 124. For example, the management support software 132 calls the function "GetStateInfo(key, timestamp)" of the application programming interface 136, as will be appreciated by those skilled in the art.

The application software 130 returns the state information to the management support software 132 through the application programming interface 136 of the software component 124. The management support software 132 of the software component 124 sends the state information to the management support software 132 of the software component 126. The management support software 132 of the software component 126 employs the application programming interface 136 to set the initial values of the application software 130 of the software component 126. For example, the management support software 132 calls the function "SetStateInfo(key, data)" of the application programming interface 136. The application software 130 of the software component 126 receives the state information and obtains the first portion of state information from this message. The application software 130 sets the initial values with the first portion of state information to complete initialization of the software component 126, as will be appreciated by those skilled in the art.

The management support software 132 of the software component 126 in one example provides fault tolerance for obtaining the first portion of state information. In one example, if the management support software 132 of the software component 124 fails to respond within a pre-determined time interval, for example, a timeout interval, the management support software 132 of the software component 126 requests the first portion of state information again at a later time. In another example, the management support software 132 of the software component 126 attempts to obtain the first portion of state information from another source after one or more response failures from the management support software 132 of the software component 124. For example, the management support software 132 of the software component 126 attempts to obtain the first portion of state information from another software component, for example, the software component 180. In another example, the management support software 132 of the software component 126 attempts to obtain the first portion of state information from a checkpoint destination of a software component, for example, a database or file, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise a recordable data storage medium of the management infrastructure. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A computer-readable signal-bearing medium that comprises one or more of a floppy disk, magnetic tape, CD-ROM, DVD-ROM, hard disk drive, or electronic memory that stores a software program for implementation of:

a reusable management infrastructure for a distributed software application that is external to the reusable management infrastructure, wherein the distributed software application comprises application software of a plurality of software components within a plurality of executables that run on one or more processors, wherein the plurality of software components comprise at least first and second software components;

wherein the reusable management infrastructure comprises a manager component, management support software for the first and second software components, and a configuration file;

wherein the reusable management infrastructure employs a code generator and the configuration file to generate the management support software for the first and second software components and to generate an application programming interface for communication between the management support software and the application software;

wherein the manager component causes a first software component of the distributed software application to obtain information from a second software component of the distributed software application for initialization of the first software component;

wherein the first software component comprises first management support software coupled with first application software, wherein the second software component comprises second management support software coupled with second application software;

wherein the manager component sends a message to the first management support software with an object reference of the second management support software to cause the first software component to obtain the information from a checkpoint of the second software component;

wherein, upon receipt of the message, the first management support software obtains the information from the second management support software through employment of the object reference of the second management support software;

wherein the information is shared between the first software component and the second software component;

wherein the information is stored in the checkpoint of the second software component and the first software component does not perform a checkpoint of the information.

2. The computer-readable signal-bearing medium of claim 1, wherein the second software component performs a portion of functionality of the distributed software application and provides the information to the first software component of the distributed software application.

3. The computer-readable signal-bearing medium of claim 2, wherein the first software component performs a first portion of functionality of the distributed software application, wherein the second software component performs a second portion of functionality of the distributed software application;

wherein the first portion of functionality and the second portion of functionality comprise different portions of functionality of the distributed software application.

4. The computer-readable signal-bearing medium of claim 1, wherein the first software component obtains the information from the second software component during one or more of an initialization and/or recovery of the first software component.

5. The computer-readable signal bearing medium of claim 1, wherein the message comprises a key that identifies the information and a logical timestamp of the information, wherein the key and the logical timestamp comprise a unique identifier for the information;

wherein the first software component obtains the information from the second software component through employment of the object reference, the key, and the logical timestamp.

6. The computer-readable signal-bearing medium of claim 1, wherein the management infrastructure generates an application programming interface through employment of the code generator;

wherein the application programming interface couples the first management support software with the first application software;

wherein the application programming interface couples the second management support software with the second application software.

7. The computer-readable signal-bearing medium of claim 6, wherein the application programming interface comprises a function call interface;

wherein the function call interface comprises a first function for management support software to obtain the information from application software;

wherein the function call interface comprises a second function for management support software to set one or more data structures of application software to an initial value.

8. The computer-readable signal-bearing medium of claim 7, wherein the second management support software employs the first function to obtain the information from the second application software;

wherein the first management support software employs the second function to set one or more data structures of the first application software to an initial value based on the information from the second application software.

9. The computer-readable signal-bearing medium of claim 1, wherein the first management support software sends a first request to the second management support software to obtain the information from the second software component;
  wherein the first management support software sends a second request to the second management support software to obtain the information upon a failure to respond to the first request by the second management support software.

10. The computer-readable signal-bearing medium of claim 1, wherein the first management support software sends a first request to the second management support software to obtain the information from the second software component;
  wherein the first management support software sends a second request to a third management support software of a third software component to obtain the information from the third software component.

11. The computer-readable signal-bearing medium of claim 10, wherein the first management support software sends the second request to the third management support software based on a fault escalation procedure of the manager component.

12. The computer-readable signal-bearing medium of claim 11, wherein the manager component obtains the fault escalation procedure from a configuration file.

13. A computer-readable signal-bearing medium that comprises one or more of a floppy disk, magnetic tape, CD-ROM, DVD-ROM, hard disk drive, or electronic memory that stores a software program for implementation of:
  a reusable management infrastructure for a distributed software application that is external to the reusable management infrastructure, wherein the distributed software application comprises application software of a plurality of software components within a plurality of executables that run on one or more processors, wherein the plurality of software components comprise at least first and second software components;
  wherein the reusable management infrastructure comprises a high availability manager component, management support software for the one or more software components, and a configuration file;
  wherein the reusable management infrastructure employs a code generator and the configuration file to generate the management support software for the first and second software components and to generate an application programming interface for communication between the management support software and the application software;
  wherein the first software component comprises first application software that performs a first portion of functionality of the distributed software application and first management support software that comprises a first portion of the high availability infrastructure;
  wherein the second software component comprises second application software that performs a second portion of functionality of the distributed software application and second management support software that comprises a second portion of the high availability infrastructure;
  wherein the high availability manager component causes the first management support software of the first software component to obtain information from the second management support software of the second software component;
  wherein the manager component sends a message to the first management support software with an object reference of the second management support software to cause the first software component to obtain the information from a checkpoint of the second software component;
  wherein, upon receipt of the message, the first management support software obtains the information from the second management support software through employment of the object reference of the second management support software;
  wherein the information is shared between the first software component and the second software component;
  wherein the information is stored in the checkpoint of the second software component and the first software component does not perform a checkpoint of the information.

14. The computer-readable signal-bearing medium of claim 13, wherein the high availability manager component generates an application programming interface through employment of the code generator;
  wherein the second management support software employs the application programming interface to obtain the information from the second application software;
  wherein the first management support software employs the application programming interface to set one or more initial values of the first application software based on the information.

15. The computer-readable signal-bearing medium of claim 13, wherein the first management support software sends a first request to the second management support software to obtain the information from the second software component;
  wherein the first management support software sends a second request to the second management support software to obtain the information upon a failure to respond to the first request by the second management support software.

16. A method, comprising the steps of:
  receiving a message from a high availability manager component of a reusable management infrastructure for a distributed software application that is external to the reusable management infrastructure, wherein the distributed software application comprises application software of a plurality of software components within a plurality of executables that run on one or more processors, wherein the plurality of software components comprise at least first and second software components, wherein the message comprises an instruction to obtain information for initialization of the first software component from the second software component;
  wherein the reusable management infrastructure comprises a manager component, management support software for the first and second software components, and a configuration file, wherein the reusable management infrastructure employs a code generator and the configuration file to generate the management support software for the first and second software components and to generate an application programming interface for communication between the management support software and the application software;
  the method further comprising the steps of:
  obtaining the information from a checkpoint of the second software component, wherein the second software component is identified by an object reference in the message from the high availability manager component;
  wherein the information is shared between the first software component and the second software component;
  wherein the first software component does not perform a checkpoint of the information.

17. The method of claim 16, wherein the step of obtaining the information for the initialization of the first software component from the second software component, of the distributed software application, comprises the step of:
   sending a first message to the second software component to request the information;
   sending a second message to the second software component to request the information upon a timeout of the first message.

18. The method of claim 16, wherein the step of obtaining the information for the initialization of the first software component from the second software component, of the distributed software application, comprises the step of:
   sending a first message to the second software component to request the information;
   making a determination of a third software component based on a configuration file;
   sending a second message to the third software component to request the information upon a timeout of the first message.

* * * * *